United States Patent [19]

Buck

[11] Patent Number: 4,660,528

[45] Date of Patent: Apr. 28, 1987

[54] APPARATUS FOR REMOTE TERMINATION OF THE OPERATION OF A SELECTED MOTOR VEHICLE

[76] Inventor: Gene Buck, P.O. Box 421, Spring Valley, Calif. 92077

[21] Appl. No.: 840,010

[22] Filed: Mar. 17, 1986

[51] Int. Cl.⁴ .................... F02D 11/04; F02D 41/22
[52] U.S. Cl. .................... 123/333; 123/335; 123/198 DB; 123/198 DC; 180/167; 340/53
[58] Field of Search .... 123/198 D, 198 DB, 198 DC, 123/333, 335; 180/167, 282; 340/53, 62

[56] References Cited

U.S. PATENT DOCUMENTS

| | | | |
|---|---|---|---|
| 3,112,004 | 11/1963 | Neaville | 180/167 |
| 3,396,811 | 8/1968 | Bowers et al. | 180/167 |
| 3,580,353 | 5/1971 | Thompson | 180/167 |
| 3,748,641 | 7/1973 | Hartung | 340/53 |
| 4,236,594 | 12/1980 | Ramsperger | 180/167 |
| 4,619,231 | 10/1986 | Stolar et al. | 123/333 |

Primary Examiner—Willis R. Wolfe, Jr.
Attorney, Agent, or Firm—Frank D. Gilliam

[57] ABSTRACT

The invention is directed to an RF means for terminating the normal operation of a selected motor vehicle. A plurality of motor vehicles each have an RF receiver tuned to a frequency and EIA tones specific to their license plate indica. Selected other motor vehicles have an RF transmitter and EIA tone generator which can be selectively tuned to transmit a signal which is receivable by a selected one of the motor vehicle receivers and when received stops the operation of that selected vehicle by terminating the fuel supply or removing ignition voltage to the motor vehicles internal combustion engine.

7 Claims, 6 Drawing Figures

FIGURE 3

APPARATUS FOR REMOTE TERMINATION OF THE OPERATION OF A SELECTED MOTOR VEHICLE

BACKGROUND OF THE INVENTION

1. Field of Invention

The present invention relates to theft prevention devices and more particular to the remote termination of the operation of a selected motor vehicle by law enforcement officers.

2. Background of the Invention

Many types of theft prevention apparatus for motor vehicles are known and presently used. These may be divided generally into two categories one for preventing the initial operation of a motor vehicle and the second for stopping an operating motor vehicle. This invention is directed to the latter.

U.S. Pat. No. 3,112,004 issued to Arthur W. Neaville teaches the use of infrared carrier waves directed from a first vehicle toward an infrared receiver on a second vehicle to terminate the operation of the first vehicle. This system requires a short distance between the transmitter and receiver and a direct line of site transmission therebetween to a specific location on the receiver.

U.S. Pat. No. 3,580,353 issued to Kermith R. Thomson teaches a fuel cutoff devise adapted to the fuel line of a motor vehicle for terminating the fuel to a vehicle so equipped by remote radio transmission means. The device is utilized in a plurality of vehicles and the radio transmitter is capable of terminating the fuel supply to all of the vehicles, so equipped located in a predetermined radius of the radio transmitter. This system has the principal disadvantage of stopping all vehicles so equipped in a given location which could be in a location which blocks the path or travel of emergency vehicles or the like.

There is a continuing need for an improved means and method of terminating the operation of a selected motor vehicle to prevent the theft of that vehicle and to prevent personal injuries resulting from high speed chases by law enforcement personal in apprehending a stolen vehicle.

SUMMARY OF THE INVENTION

This invention relates to the termination of the operation of a selected moving vehicle by a second vehicle of authority, such as a law enforcement vehicle operated by Federal, state or local government agencies.

The selected vehicle is equipped with a radio receiver which receives and accepts only coded signals related to that vehicle. Typically the receiver is tuned to receive only signals which are directly related to the letters and numbers of its registration plate carried externally thereon and readily visible to vehicle operators of other vehicles adjacent the front or rear of that vehicle. If the receiver of a vehicle receives its precoded radio signal a relay operates to close the vehicles fuel supply orrenders its electrical ignition system inoperative, thereby terminating the operation of that vehicle's internal combustion engine. The transmitter carried by the law enforcement vehicle is manually programmable to program its output signal so that it can be coded to be received by any selected one of a plurality of different vehicles by programming the transmitter to the registration indica of the selected vehicle and then activating the transmitter. If the vehicle so selected is within range of the transmitter and the transmitter is transmitting that vehicle will become and remain inoperative.

An object of this invention is to provide a means of terminating the operation a selected one of a plurality of adjacent motor vehicles by remote radio means.

Another object of this invention is to provide a remote radio means of terminating the operation of a selected vehicle by the use of that selected vehicles external registration indica.

Still another object of this invention is to provide vehicle engine interruption means activated by a receiver carried by a vehicle which will activate its engine interruption means only upon receiving a specifically coded radio signal and a law enforcement vehicle which is equipped with a radio transmitter which can be manually programmed to transmit specific radio code directed to a selected one of a plurality of vehicles equipped with a receiver and engine interruption means.

DETAILED DESCRIPTION

Figure 1:
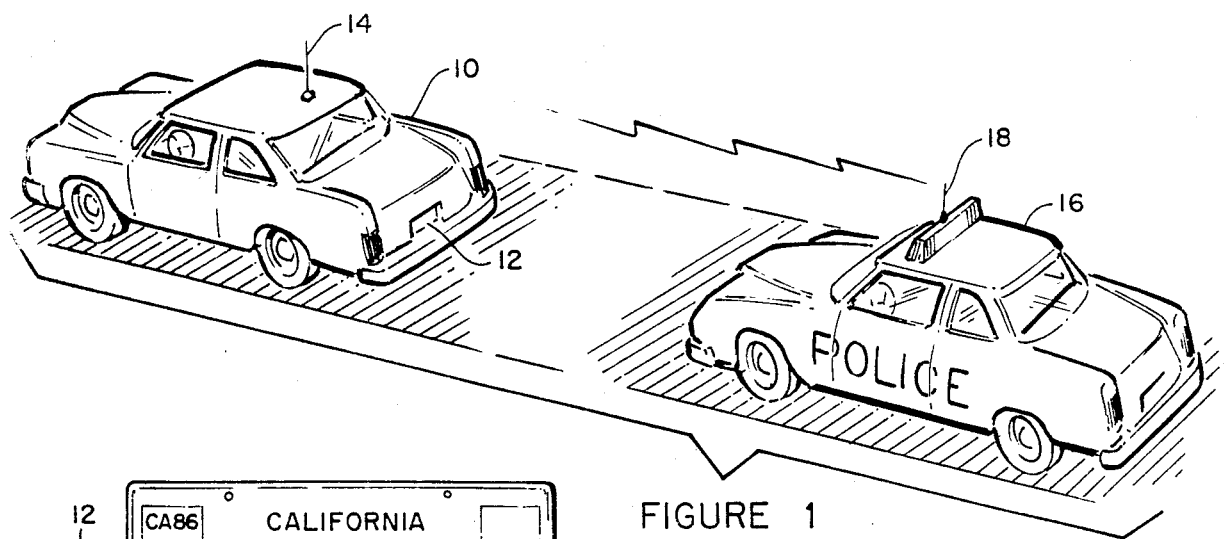
FIG. 1 is a perspective view of two vehicles equipped with the present invention.

Referring now to the various Figures, FIG. 1 depicts a vehicle 10 which is equipped with a license plate 12 attached to at least the rear portion of the vehicle and a receiving antenna 14 and a law enforcement vehicle or the like 16 equipped with a transmitting antenna 18. Both vehicles 10 and 16 are equipped with other components of the invention as hereinafter discussed in more detail.

Figure 2:
FIG. 2 is a showing of a license plate of one of the vehicles of FIG. 1.

FIG. 2 depicts an enlargement of the license plate 12 showing the registration indica 20 thereon.

Figure 3:
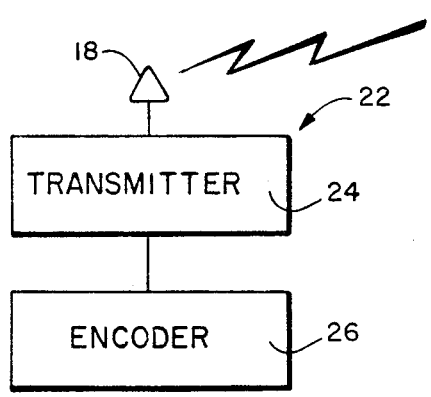
FIG. 3 is a block diagram showing of the transmitter portions of this invention.

Reference is now made to FIG. 3 which illustrates in block form the radio transmitter portion 22 of the invention. The transmitter portion 22 includes a transmitting antenna 18, a radio transmitter 24, an alphanumerical keyboard 28 (see FIG. 4), and an encoder 26 for producing a plurality of coded tones.

The transmitting antenna and the radio transmitter can, for example and not by way of limitation, be a modified Kenwood Model TIR 2600A with the receiver portion removed and the 16 function programming key board 28 (see FIG. 4) interconnected to one or more Communications Specialty Inc. Model T532 encorder or the like so that one or more standard EIA tones can be generated as a tone code for transmission with the carrier of the transmitter. The memory within the Kenwood transceiver or one equivalent thereto can be used to store the tones making up the tone code for repeated or continuous cycling of the transmission of the coded signal. The particular transmitting element described above transmits over the range of 144–148 MHZ with a power output of 2.5 watts. Any other frequency or power range can be used to practice the invention.

Figure 4:
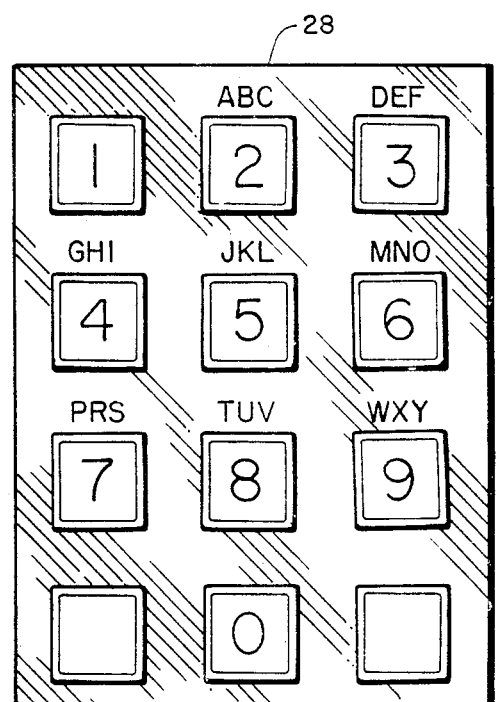
FIG. 4 is a plan view of a programmable alphanumerical keyboard.

FIG. 4 depicts a plan view of the keyboard 28 for programming the encorder.

Figure 5:
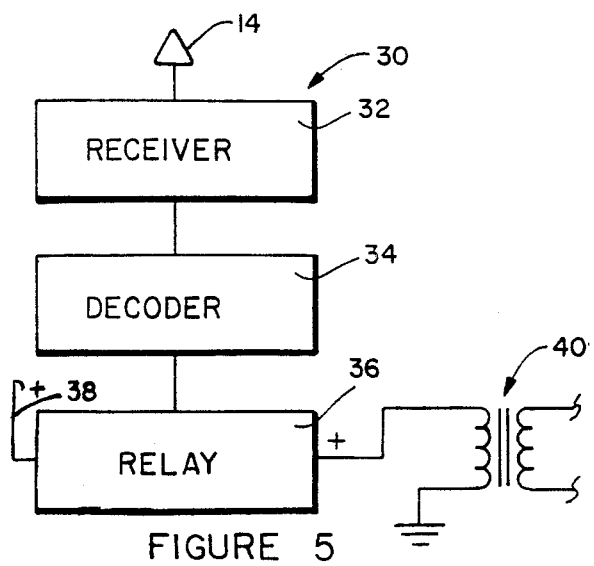
FIG. 5 is a block diagram showing of the receiving portion of the invention and one means for terminating the operation of a vehicle.

Referring now to FIG. 5, a block diagram of the receiver section 30 is shown. The receiver section 30 consists of a receiving antenna 14 a receiver 32, a tone decoder 34 and a relay switch 36 connected between the vehicle power source 38 and the ignition coil 40 of the vehicle on which this section 30 is installed in accordance with this invention. The receiver section 30 would be the same or similar to the receiver section, memory and encoder of the above referenced Kenwood Transceiver or any equivalent thereto.

Figure 6:
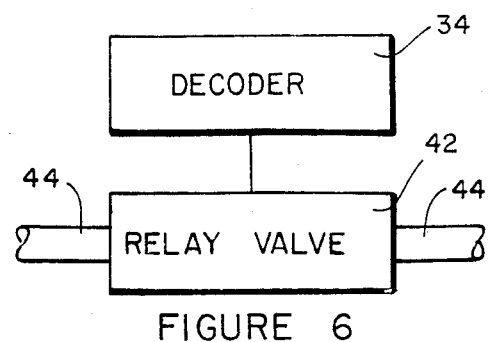
FIG. 6 is a block diagram showing of a second means for terminating the operation of a vehicle.

Referring now to FIG. 6, a block diagram showing the encoder 34 of FIG. 2 interconnected to a relay valve 42 interconnected in series with the fuel line 44 of the vehicle 10 which provides fuel from the vehicle fuel storage tank and the vehicle fuel pump (not shown) examples of relay shut off valves can be found in U.S. Pat. Nos. 3,112,004; 3,500,353; and 3,756,341. The invention, however, should not be considered to be limited by these teachings. Other electric valves are readily available and could be used to practice this invention.

The transmitting section 22 is installed in a selected law enforcement vehicle or vehicles or could be in the form of a hand held transmitter carried by personnel in such vehicles. Obviously the transmitter section could be installed in any vehicle or hand held by anyone, but preferably the transmitter section will be kept from the general public for obvious reasons.

The receiver section 30 is installed in each of a plurality of vehicles and preferrably in all vehicles which are licensed for operation. For spark ignition engined vehicles the relay switch 36 or the relay valve 42 may be employed. In compression ignited engine vehicles only the relay valve 42 can be employed.

In operation, each decoder 34 of the receiver section 30 is programmed to receive only a single coded signal which is related to the license number of each of the vehicles in which it is installed. Commonly vehicle license indica is readily visable by vehicle installed license plates, decode or the like. Each vehicle has its own specific coded signal.

The transmitter section 22 is either installed or carried in the law enforcement vehicle or the like and is capable of being instantly programmed to transmit any vehicle coded signal. The operator of the law enforcement vehicle can visual read the license plate of the vehicle which he or she is desirous of stopping and programs the required portions of the license plate indica into the encoder 26 and then activate the transmitter. All vehicles in the range of the transmitter receive the transmitted signal but only that vehicle having the transmitted code signal will be affected by the transmitted signal. The coded signal may consist of all the numbers and letters on the license plate, only numbers in sequence, only letters in sequence, portions of numbers and letters or any combination thereof.

Obviously the vehicles equipped with the fuel valve system will cease operation after the fuel ahead of the cut-off valve is used up while the ignition switch will immediately terminate the vehicle operation.

The system of the invention is not unlike a wireless garage door opening system except that the tone code from the transmitter is selectively and readily programmable in a manner not unlike a wireless telephone dealing system rather than being preset in the transmitter.

In view of the above, it will be seen that the several objects of the invention are achieved and other advantageous results attained.

As various changes could be made in the above construction and methods without departing from the scope of the invention, it is intended that all matter contained in the above description or shown in the accompanying drawings shall be interpreted as illustrative and not in a limiting sense.

What is claimed is:

1. An apparatus for selective termination of the normal operations of a selected one of a plurality of adjacent motor vehicles having internal combustion engines comprising:
   a plurality of first motor vehicles, each having at least visual registration plates on the rear thereof with different and distinct registration indica thereon;
   RF carrier receiver means associated with each of said plurality of first motor vehicles, said receiver capable of receiving only a specific RF carrier frequency and a specific number and type of EIA tone signals directly related to their registration indica and producing an output voltage signal when received;
   internal combustion engine interruption means associated with each of signal RF carrier receiver means and said internal combustion engine for interrupting the normal operation of said internal combustion engine of a selected motor vehicle when an output voltage signal is produced by that motor vehicle RF carrier receiver; and
   a second motor vehicle having a RF carrier and EIA tone generator transmitter readiably programmable to a specific RF carrier frequency and specific number and type of EIA tones related to the registration indica of a selected one of said plurality of first motor vehicles, whereby the normal operations of the internal combustion engine of said selected one of said plurality of motor vehicles is terminated when said RF carrier and EIA tone generating transmitter is activated.

2. The inventions as defined in claim 1 wherein said registration indica includes numerals and letters.

3. The invention as defined in claim 2 wherein each number and letter has a designated EIA tone.

4. The invention as defined in claim 1 wherein said receiver and transmitter are operatable in a carrier range of from 144 to 148 mega hertz.

5. The invention as defined in claim 1 wherein said internal combustion engine include ignition means and said motor vehicles include electrical power means for operating said ignition and said internal combustion interruption means is a relay switch positioned between said electrical power means and said ignition means whereby said output voltage signal operates said relay switch removing power from said electrical power means from said ignition means thereby terminating the operation of said internal combustion engine.

6. The invention as defined in claim 1 wherein said motor vehicle includes fuel supply means and said internal combustion interruptor means is a valve positioned believes said fuel supply means and said internal combustion engine whereby said output voltage signal operates said valve cutting off the fuel supply to said internal combustion engine thereby terminating the operation of said internal combustion engine.

7. The invention as defined in claim 1 wherein the operation of the internal combustion engine of a selected motor vehicle is inoperative so long as said transmitter transmits a signal.

* * * * *